Aug. 27, 1929.  T. HALAGARDA  1,725,790
LOCK NUT
Filed Sept. 8, 1928
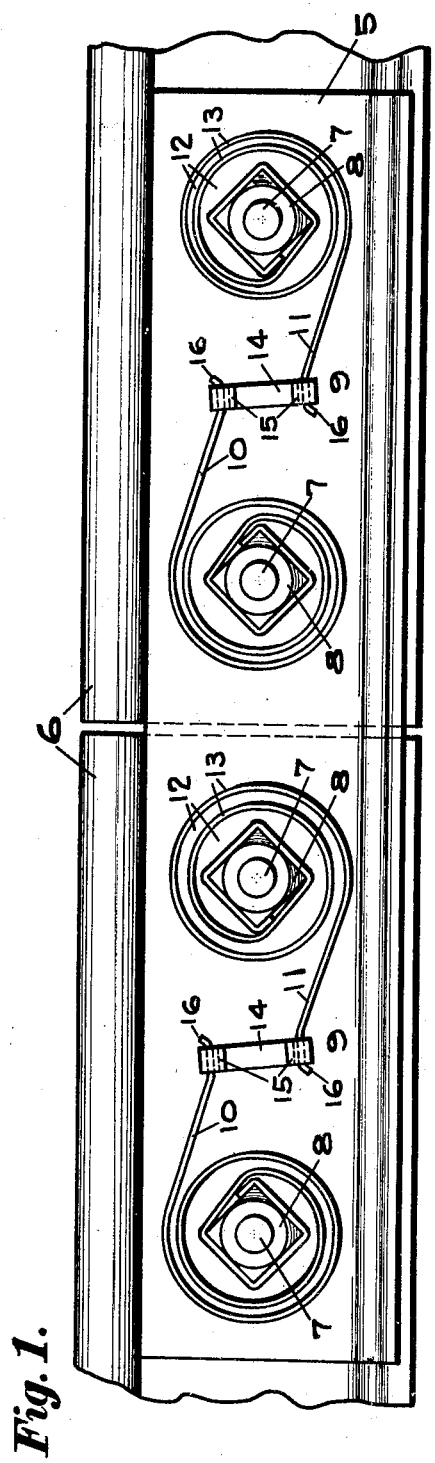
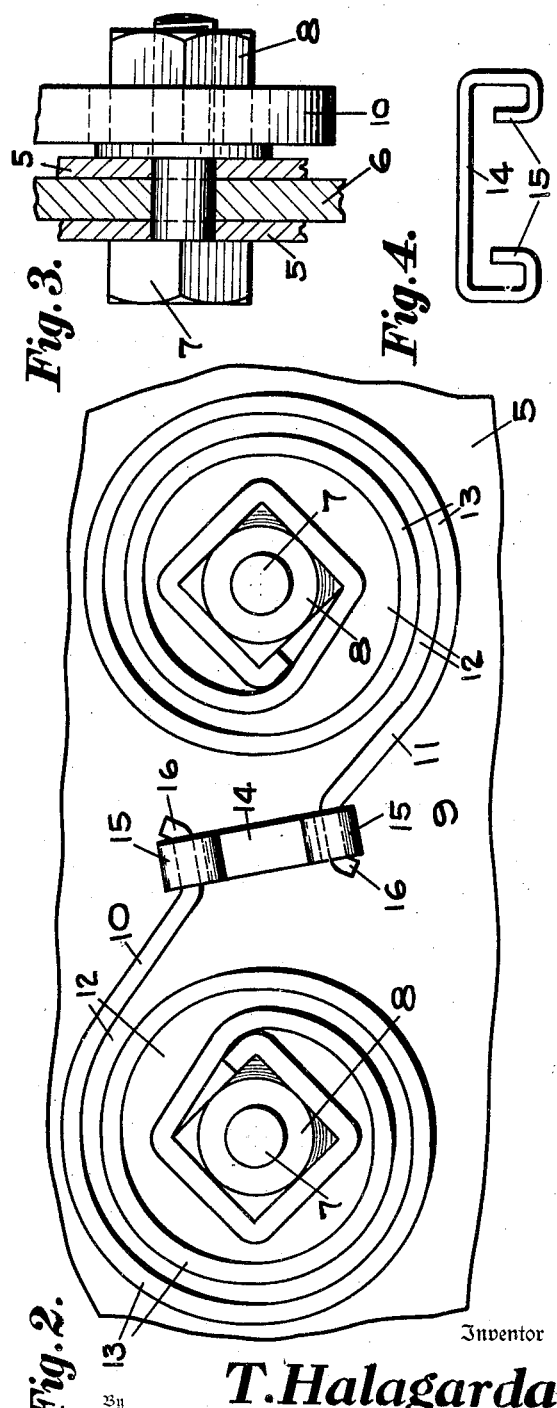
Inventor
T. Halagarda
Hiram A. Sturges
Attorney Patented Aug. 27, 1929.

1,725,790

UNITED STATES PATENT OFFICE.

THOMAS HALAGARDA, OF OMAHA, NEBRASKA.

LOCK NUT.

Application filed September 8, 1928. Serial No. 304,734.

This invention relates to an improvement in lock nuts and has for its object, broadly, to provide lock nuts used in pairs which may be conveniently applied to the nuts of threaded bolts and will be effective for preventing displacements, will permit convenient removal of the bolts, whenever such removal is required.

One of the objects of the invention is to provide springs which are coiled on the nuts, each coil on a nut being disposed in spaced relation from an adjacent coil thereof.

Another object is to provide such a construction that adjustments may be made for increasing the force exerted by the springs.

Still another object is to provide springs which will permit engagement of a wrench on the nuts without removal of the springs. It is an object of the invention to provide such a construction for the springs that they will normally tend to cause rotation of the nuts for tightening them on the bolts in instances where they have become loose from shrinkage of timbers or from rust or vibration.

I am aware that lock nuts have heretofore been used in pairs, the lock on one nut of a bolt co-operating with the lock of another nut of the other bolt of said pair, and also I am aware that springs have been employed to normally resist rotation of the nuts of threaded bolts, but am not aware that any lock nuts have heretofore been known which include springs having separated coils for the nuts, nor which provide the advantages of the present construction.

With the objects first mentioned in view and others to be mentioned, the invention presents a new and useful construction, combination and arrangement of parts as shown and described herein and claimed and as illustrated in the accompanying drawing, it being understood that changes may be made in form, size, proportion and minor details, said changes being within the scope of the invention as claimed.

In the drawing, Fig. 1 is a view in side elevation showing two pairs of lock nuts used for securing fish-plates to a track rail, the latter being broken away. Fig. 2 is an enlarged side view showing a pair of lock nuts mounted upon a pair of threaded bolts, a fish-plate or other support, broken away, also being shown. Fig. 3 is a detail relating to Fig. 1, showing a part of a track rail and pair of fish-plates in transverse section and a lock nut mounted on a bolt. Fig. 4 shows a coupling-member or yoke for removably connecting the ends of a pair of springs.

Referring now to the drawing for a more particular description, the invention is shown and described in connection with the pair of fish-plates 5 which are secured to the adjacent end-portions of a pair of track rails 6 by use of threaded bolts 7 provided with nuts 8, these parts being conventional, and of any suitable construction. While I have shown only two pairs of bolts any suitable number of bolts arranged in pairs may be used, and while I have shown fish-plates and track rails traversed by bolts, the present invention may be used upon bolts which traverse other supports.

The invention consists of a pair of springs 9 and 10 each secured at one of its ends by any suitable means to a nut 8, each spring being wound upon a nut "clockwise" or in the same direction as the rotation of the nut upon a bolt when mounting it on said bolt, the winding of the spring being such that annular spaces or recesses 12 will be provided between the coils 13 of the spring.

Numerals 14 indicate yokes or coupling-bars each having loops 15 at its ends adapted to receive an end-portion of a spring, the outer terminal of each spring having a projection 16 operating as a stop-member as an aid in maintaining the loop 15 of a yoke in engagement with a spring, and preventing any sliding movement of a yoke on the spring.

As best shown in Fig. 3 of the drawing, the length of the nuts is greater than the width of the springs, and therefore the nuts may be engaged by a wrench (not shown) without removing the springs from the nuts, this feature being of advantage in the operation of removing the nuts from the bolts or mounting the nuts thereon.

In operation, the springs are secured to the nuts by any suitable means and are wound thereon to provide the coils mentioned and spaces between the coils, the yokes 14 being mounted upon the terminals of the springs and, as is obvious, any rotation of the nuts in a direction for their removal from the bolts will be prevented. Also according to the present construction the force of the springs or either spring of a pair may be increased by winding to provide an additional coil. Also it will be seen that the entire length of each spring is utilized in resisting stresses for the reason that the spaces 12 are provided between the coils 13.

While I have shown and prefer flat springs I do not wish to be limited in this respect and I may use springs of any desired form in cross-section.

I claim as my invention,—

In combination with a pair of adjacent nuts and bolts, a coil spring having one end secured to each of the nuts and wound in a number of convolutions thereon, the free ends of the two coil springs being directed toward one another and having their terminal ends overlapping and turned out in relatively opposite directions, and a yoke bar extending across between said overlapping ends of the springs and having downturned portions, inturned portions and upturned terminal ends for forming gripping members to engage the ends of the two coil springs inwardly of the out-turned terminal ends of such coil springs.

In testimony whereof, I have affixed my signature.

THOMAS HALAGARDA.